May 27, 1947.  E. E. LAKSO  2,421,100
APPARATUS FOR THE REPAIR OF TIRES
Filed March 28, 1944  2 Sheets-Sheet 2
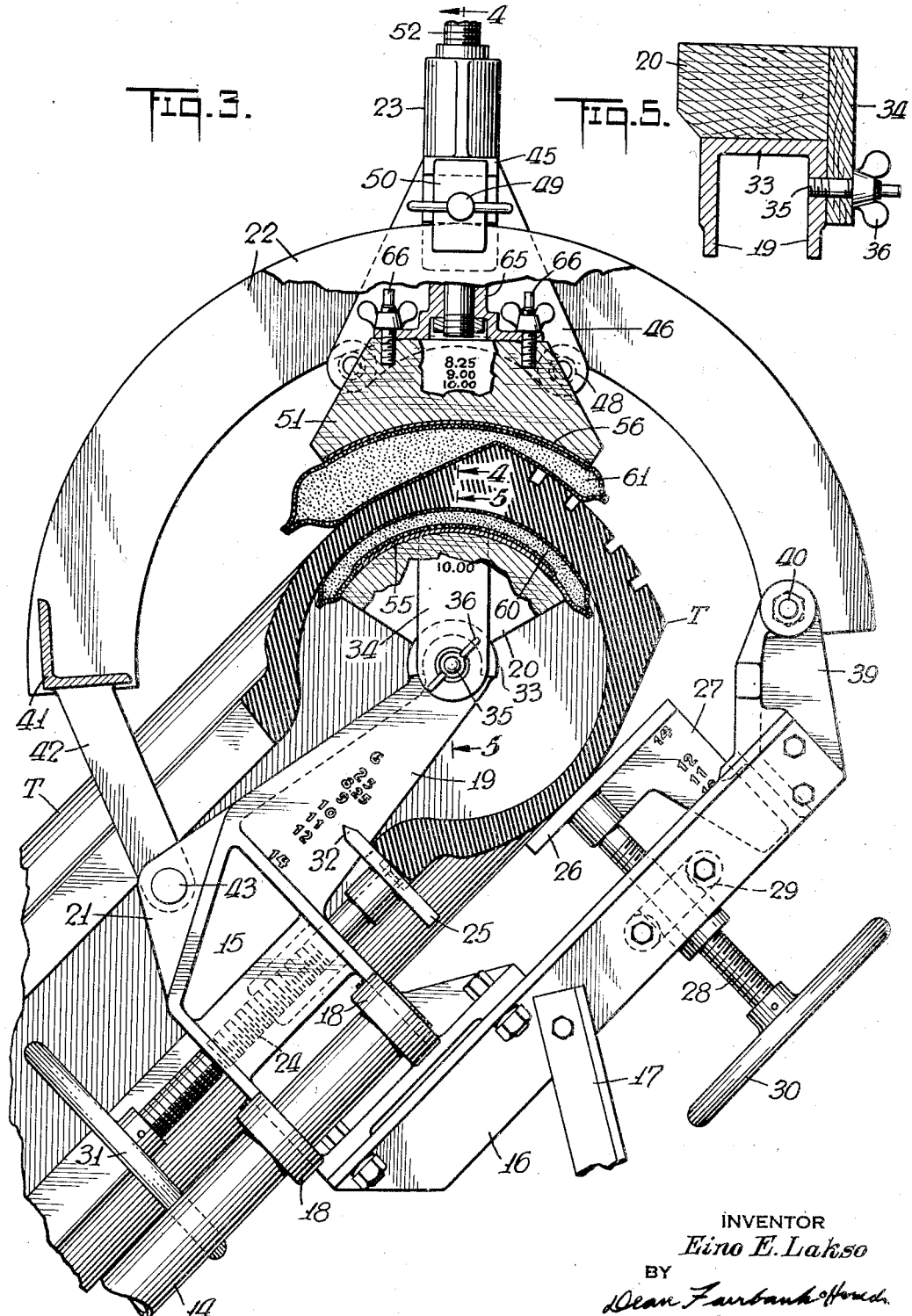
INVENTOR
*Eino E. Lakso*
BY
*Dean Fairbank Howd*
ATTORNEYS Patented May 27, 1947

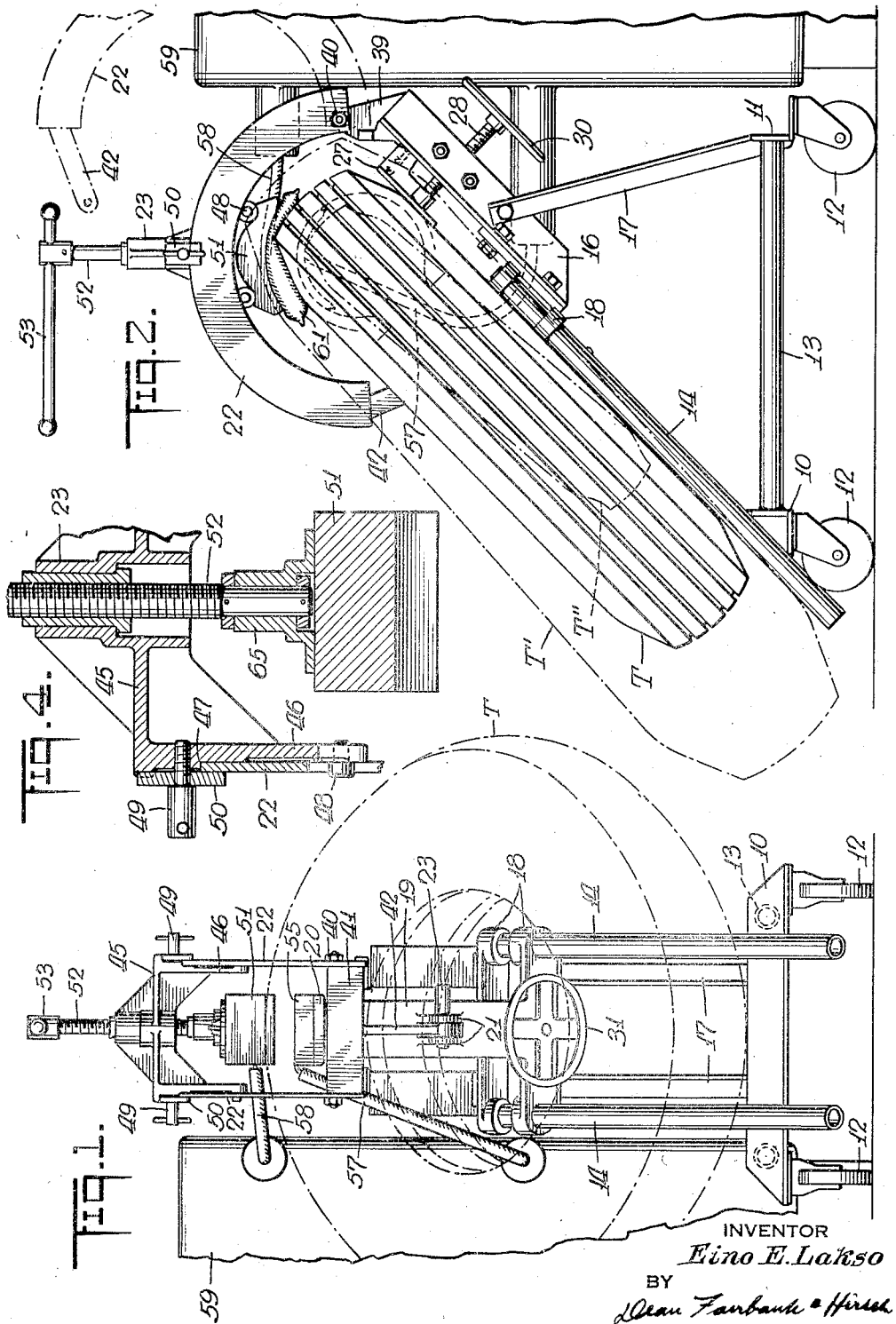

2,421,100

UNITED STATES PATENT OFFICE 2,421,100

APPARATUS FOR THE REPAIR OF TIRES

Eino E. Lakso, Fitchburg, Mass., assignor to Clarence W. Vogt, Norwalk, Conn.

Application March 28, 1944, Serial No. 528,396

18 Claims. (Cl. 18—18)

This invention relates to apparatus for use in the repair of pneumatic tires by the vulcanizing of uncured rubber or rubber composition at the area on the tire where repair is needed, and to restore the contour and strength of the tire.

In my prior application Serial No. 507,940 I have shown and claimed an apparatus in which the heating effect for the vulcanization is produced by a high frequency current developing an electrostatic field between two electrodes disposed on opposite sides of the tire wall. The electrodes are relatively movable toward and from each other, and spaced from the tire surface by pads of deformable dielectric material so that direct contact of the electrodes with the tire is prevented and proper pressure can be applied uniformly over the area to be vulcanized, and during the vulcanization.

My present invention is an improvement on that illustrated in said application, and has for one object the provision of a portable device which may receive and support a tire of any size or shape and with any portion thereof needing repair held in convenient position for said repair.

A further object is to provide a more effective means for positioning and supporting the tire casing to facilitate the application of the electrodes thereto.

A further object is to permit and facilitate the ready adjustment of the electrodes so that the heating effect may be produced in any part of the tire wall from near one bead around to near the other bead.

My improved apparatus embodies many novel features of construction and design, and has many advantages and accomplishes many other objects as will be pointed out hereinafter or will be apparent from a consideration of the embodiment shown in the accompanying drawings.

In these drawings:

Fig. 1 is a face view of one form of apparatus embodying my invention.

Fig. 2 is a side view of said apparatus.

Fig. 3 is a view similar to a portion of Fig. 2, but on a larger scale, and with a tire and certain parts of the apparatus shown in section.

Fig. 4 is a section on the line 4—4 of Fig. 3, and taken through the outer electrode support, and Fig. 5 is a section on the line 5—5 of Fig. 3, and taken through the inner electrode carrier.

In the construction illustrated, the tire is supported on a portable truck which has a base formed of a pair of angle irons 10 and 11, each supported at each end by wheels 12, and connected by rods 13. This truck base has a tire supporting platform for holding a tire casing in an inclined position, and preferably at an angle of about 45° to the horizontal. I have illustrated in solid lines a medium size of tire T on said platform, and in dot and dash lines a larger tire T' and a smaller tire T''. This platform includes a pair of rods 14 with their lower ends supported by and welded or otherwise rigidly secured to the angle iron 10 of the base, and their upper ends secured to a bracket 15. The bracket may be formed of a single casting or of a plurality of members welded or otherwise secured together. This bracket is bolted or otherwise secured to a pair of angle irons 16 which are supported in the desired inclined position by braces 17 having their lower end secured to the base member 11.

The bracket 15 includes a pair of socket elements 18 for receiving the upper ends of the rods 14, an arm 19 for adjustably supporting an electrode support, a pair of lugs 21 for attachment of one end of an arcuate track or carrier 22 for a second electrode carrier, and a threaded passage 24 for a tire positioning member 25. The inclined tire platform formed of the rods 14, bracket 15 and angle irons 16, carries a second tire positioning member 26.

The apparatus as shown will receive and properly position tires of a wide range of sizes, and the positioning members 25 and 26 are preferably calibrated so that they may be adjusted to the proper position for the tire. The lower part of the tire rests on the lower part of the platform rods 14 while the side wall of the upper part rests on the positioning member 26 and has its bead engaging the positioning member 25.

The member 26 is in the form of a plate having an arm 27 in sliding engagement with a slot in the bracket 39 and a screw bolt 28 threaded through a bracket 29 and provided with a handle or hand wheel 30. By turning the hand wheel the tire support may be raised or lowered to the proper position for the size of tire being repaired. The positioning member 25 is also in the form of a plate or bar and engages the bead of the tire. It is provided with an adjusting screw bolt threaded in the bracket 15 and having a handle or hand wheel 31 and also having a pointer 32 positioned adjacent to the bracket arm 19. This arm and the arm 27 are calibrated for the various sizes of tires. By size is meant the distance transversely through the tire, and not the diameter of the tire. For instance, the apparatus shown may take a tire of 6 inches to 14 inches in size, and is shown in the adjusted position for a 10 inch tire. It will be noted that the members 25 and 26 are adjustable in directions at right angles to each other.

The inner electrode support is preferably in the form of a block of wood 20 having an outer surface convexly curved to correspond to the average or mean curvatures of a range of tires to be repaired. That shown is for a 10 inch tire, or a tire somewhat larger or somewhat smaller. The inner surface of the block is concavely curved and rests on a curved hub or flange 33 on the end of the arm 19. This arm projects into the tire between the beads and the hub is so positioned that when the tire is properly adjusted by the members 25 and 26 it will be at the center of the chamber in the tire casing, and in which the inner tube is held when the tire is in use. The block 20 has an arm 34 rigid or integral therewith, and which may be tightly clamped to the arm 19 by a bolt 35 secured to the arm at the center of curvature of the hub 33. By loosening the wing nut 36 on said bolt, the block 20 constituting the electrode carrier may be rotated on the stationary hub 33 and about the bolt 35 as a center until it is brought into proper registry with a portion of the tire wall at any place between the bead and the center of the tread and depending upon the location of the area to be repaired.

The other or outer electrode support is adjustable along the carrier or track 22, which latter comprises a pair of parallel arcuate rails separately pivoted or hinged at the one end to corresponding brackets 39 secured to the upper ends of the angle irons 16 of the inclined tire platform to swing about pintles 40. The arcuate rails 22 are secured together at the other end by a bar 41 which has an arm 42, the lower end of which is received between the lugs 21 of the bracket 15 and detachably held by a removable pin 43.

The rails are curved in an arc having the bolt 35 as a center so that the outer electrode carrier may be adjusted along the rails so as to come into registry with the inner electrode carrier, regardless of the position of the latter.

The outer electrode carrier includes a carriage having a transverse plate 45 with side flanges 46 disposed adjacent to and movable along the rails 22. Each flange has a shoulder 47 resting on the outer edge of its respective rail and has a pair of spaced studs 48 engaging the inner edge of its rail. The side walls or flanges 46 of the carriage each have a screw bolt 49 and a washer or clamping member 50 engaging the adjacent rail 22 so that by loosening the bolt 49 the carriage may be moved along the arcuate rails to the desired position, and may be tightly clamped in position.

This outer electrode support includes a block of wood 51 having a concave inner surface substantially parallel to the convex surface of the inner electrode support 20. This block has a collar 65 swiveled on a bolt 52 which extends radially through the plate 45 of the carriage and threaded in a sleeve thereon so that by turning a handle 53 on the outer end of the bolt, the block may be moved inward radially and toward and from the inner electrode carrier, as an extension of the axis of the bolt 52 intersects an extension of the axis of the bolt 35. The block 51 is detachably secured to the collar 65 on the screw bolt 52 by means of screw bolts 66 or equivalent attaching means.

Secured in any suitable manner to the outer surface of the inner carrier block 20 and to the inner surface of the outer carrier block 51, there are provided spaced curved metal electrode plates 55 and 56. These, as shown particularly in Figs. 1 and 2, may be connected by cables 57 and 58 to a suitable apparatus 59 for generating a high frequency electric current of the proper frequency and voltage to produce an electrostatic field between the two electrodes and to produce a temperature within that field sufficiently high to insure the proper vulcanization of the rubber used in repairing the tire.

The unit 59 per se does not form any novel part of my invention and may be of the same type as commonly employed for producing an electrostatic field by high frequency electric currents. In test operations, a unit designed and intended for diathermy has been found satisfactory, but any other suitable type may be used.

In order to prevent direct contact of the electrodes with the rubber and to provide proper and uniform pressure over the opposed surfaces of the tire wall, which is to be repaired, and in spite of variations in the contour of the outer surface of the tire wall, and particularly the outer surface at or adjacent to the tread, there are provided a pair of pads 60 and 61, which lie between the electrodes and the tire wall. These are formed of suitable dielectric material and are deformable, so that under pressure they will conform to the surfaces of the electrodes and the tire wall and will apply substantially uniform pressure across the area to be vulcanized and maintain the necessary parallelism between the electrodes. Merely as an example, these pads may be formed of canvas and filled with sand. Various other forms of pads and other filling material may be used.

As the inner surface of the tire wall has a substantially uniform curvature and the inner block may have the same curvature, the pad 60 may be omitted; but as the outer surface of the tire varies in shape depending upon the type and design of the tread portion the outer pad 61 is essential for the application of uniform pressure and the maintaining of the two electrode plates substantially parallel.

Inasmuch as the curvature of the outer and inner surfaces of the tire wall will vary with the size of the tire, it is preferable to provide a plurality of the blocks 20 and 51 for different sizes of tires. Because the tire wall is flexible, it is not necessary to provide separate blocks for each size. For the range of sizes from 6 inches to 14 inches, three or four different pairs of blocks may be used, each pair with a different curvature and each suitable for two or more sizes of tires. The inner block may be readily removed by taking off the wing nut 36 and a different size substituted, and the outer block may be similarly replaced by a different size by removing the wing nuts on the bolts 66. A separate electrode plate may be fixed to each block and removed with it, or the electrode plates may be flexible and affixed to the cables so that they need not be removed and will take the curvature of any block being used.

In the use of the apparatus above described, the pin 43 may be removed and the arcuate rails 22 with the outer electrode carrier mounted thereon may be swung about the pivot bolt 40 to the position shown in dotted lines in Fig. 2. The size of the tire to be repaired is noted and the hand wheels 30 and 31 turned to bring the tire positioning members 25 and 26 to the proper position for that particular size of tire. If necessary, the blocks 20 and 51, with or without the electrodes, may be removed and replaced by a different size, corresponding to that of the tire.

To position a tire, the tire positioners 25 and 26 are set to a size slightly smaller than the tire to be vulcanized. Then the inner electrode block 20 is placed into position, being inserted into the tire carcass at another point along the tire periphery which has been spread open by a conventional spreader. The tire positioners are now adjusted to the proper tire size which brings the inner surface of the tire into contact with the inner electrode pad 60 or into contact with the curved electrode plate 55 if the pad 60 be omitted. The arcuate rail member 22 is swung into the position shown in Fig. 3 and locked by pin 43. The outer electrode carrier is then brought into position opposite the inner electrode and secured by means of clamps 50 and screw 49. The pad 61 is placed between the outer surface of the tire and the inner surface of the block 51 and pressure is then applied by means of screw 52 and lever 53.

If the curvature of the inner surface of the tire wall does not exactly conform to the curvature of the inner electrode 55 and the substantially parallel outer electrode 56, the pressure applied in moving the outer electrode toward the inner one will act to slightly bend the tire wall so that all parts of the wall between the electrodes will be subjected to the desired pressure.

With the parts in position and the tire wall under the desired pressure, the current is turned on to produce the electrostatic heating field to vulcanize the rubber applied in repairing the tire.

It will be obvious that if the apparatus is designed for the repair of only a single size of tire, or a limited range of sizes, the means for adjusting the positions of the tire supporting elements 25 and 26 may be omitted and these parts made rigid with the inclined platform. Suitable means is preferably employed for shutting off the current when the vulcanization has been completed. This may be of the automatic type shown and claimed in application Serial No. 514,452 or that shown and claimed in application Serial No. 536,068.

Having thus described my invention, what I claim as new and desire to secure by Letters Patent is:

1. An apparatus for repairing tires, including an inclined platform for supporting the tire, a pair of electrodes for clamping a portion of the tire wall therebetween, and means positioned at one end of the platform and adapted to contact with the tire for raising and lowering a portion of the tire to vary the inclination thereof in respect to the platform and in respect to said electrodes.

2. An apparatus for repairing tires, including an inclined platform for supporting the tire, a pair of electrodes for clamping a portion of the tire wall therebetween, and means connected with said platform and adapted to contact with the tire, for sliding the tire along the platform and in respect to said electrodes.

3. An apparatus for repairing tires, including a platform for supporting the tire, an arm carried thereby and having an electrode for positioning within the tire, and means connected with said platform and adapted to contact with the tire, for moving the tire bodily in respect to the electrode.

4. An apparatus for repairing tires including a platform for supporting the tire, an arm carried by said platform and having an electrode pivotally secured thereto to swing in an arc along the inner surface of the tire wall, and means connected with said platform and adapted to contact with the tire, for moving a wall of the tire toward and from the pivotal center of said electrode.

5. An apparatus for repairing tires, including a pair of wooden blocks constituting electrode plate carriers, one of said blocks presenting a concave surface and the other a convex surface, metal electrode plates substantially conforming to said surfaces, a pair of pads of deformable dielectric material, and means for clamping a tire between said pads with said electrodes upon the outer surfaces of said pads.

6. An apparatus for repairing tires including an arm adapted to extend substantially radially of the tire, an electrode plate carrier secured to the end of said arm and presenting a convex outer surface, means for supporting a tire and adjusting the position thereof to bring the inner surface of the tire wall substantially concentric with said surface, a second electrode plate carrier having a concave surface substantially parallel to the surface of the first mentioned carrier, curved electrode plates carried by said concave and convex surfaces respectively, and a pair of deformable bags of dielectric material positioned in engagement with and between said electrode plates and between which bags a tire wall may be clamped.

7. An apparatus for the repair of tires, including a tire support, a pair of curved electrode plates, means for producing a high frequency electrostatic field between said electrodes, a pivoted support for holding one electrode plate within the tire, an arcuate member concentric with the pivotal center of said support, a support for the other electrode plate movable along said arcuate member and into opposed relationship to the electrode carried by said pivoted support, and an adjustable member connected to said support and adapted to contact with the tire, to position a wall of the tire in selected position in respect to the pivotal center of said second mentioned support.

8. An apparatus for the repair of tires, including a tire support, a pair of curved electrode plates, means for producing a high frequency electrostatic field between said electrode plates, a pivoted support for holding one electrode plate within the tire, an arcuate member concentric with the pivotal center of said support, a support for the other electrode plate movable along said arcuate member and into opposed relationship to the electrode plate carried by said pivoted support, a member connected to said tire support, adjustable in respect thereto, and adapted to contact with the tire for holding a wall of the tire in selected position in respect to the said pivoted support, and means for adjusting the second mentioned electrode plate toward and from said pivotal center, whereby the tire wall may be clamped between said electrode plates.

9. An apparatus for the repair of tires, including a tire support, a pair of curved electrode plates, means for producing a high frequency electrostatic field between said electrodes, a pivoted support for holding one electrode plate within the tire, an arcuate member concentric with the pivotal center of said support, a support for the other electrode plate movable along said arcuate member and into opposed relationship to the electrode plate carried by said pivoted support, and means adapted to contact with the tire and movable in respect to said tire support, for adjusting a tire in the direction of its axis and in a direction at right angles to its axis to position a tire wall concentric with said members and therebetween.

10. An apparatus for the repair of tires, including a pair of curved electrode plates, means for producing a high frequency electrostatic field between said electrode plates, a pivoted support for holding one electrode plate within the tire, an arcuate member concentric with the pivotal center of said support, a support for the other electrode plates movable along said arcuate member and into opposed relationship to the electrode plate carried by said pivoted support, a deformable bag adapted to rest on the tire and beneath said second mentioned electrode plate, means adapted to support the weight of the tire independently of either of said electrode supports, and means for adjusting the position of the tire in respect to said electrode supports.

11. An apparatus for repairing tires including a pair of electrode plates spaced to receive the tire wall therebetween and independently adjustable along the tire wall and toward and from the tire bead, and means for supporting and positioning the tire independent of said electrode plates and including a member for engaging the inner circumference of the tire bead for moving the tire substantially in its own plane and a member for engaging the outer surface of the outer wall for adjusting the tire in a direction substantially parallel to its axis.

12. An apparatus for repairing tires including a pair of substantially parallel electrode plates spaced to receive the tire wall therebetween and independently adjustable along the tire wall and toward and from the tire bead, while maintaining said electrode plates substantially parallel, means for producing a high frequency electrostatic field between said electrode plates, a member for engaging the outer surface of the tire wall, a member for engaging the edge of the tire bead and means for operating said members independently of each other to position the tire in respect to said electrode plates.

13. An apparatus for repairing tires, including a platform having an arm rigid therewith, an electrode carrier pivotally secured to the end of said arm, a track secured to said platform and extending in an arc substantially concentric with the pivotal center of said electrode carrier, a second electrode carrier slidably supported on said track for adjusting movement therealong into selected position, a member adapted to contact with the tire for adjustably moving and for holding the tire in a predetermined position in respect to the platform and said electrode carriers, electrodes on said carriers respectively, and means for applying a high frequency electric potential between said electrodes.

14. An apparatus for repairing tires, including a platform having an arm rigid therewith, an electrode carrier pivotally secured to the end of said arm, a track secured to said platform and extending in an arc substantially concentric with the pivotal center of said electrode carrier, a second electrode carrier slidably supported on said track for adjusting movement therealong into selected position, means for adjusting said second-mentioned electrode carrier toward and from the first-mentioned one and radially in respect to the pivotal center of the latter, a member adjustable in respect to said platform and adapted to contact with the tire for adjustably moving and holding the tire in selected position in respect to said electrode carriers, electrodes on said carriers respectively, and means for applying a high frequency electric potential to said electrodes.

15. In an apparatus for conditioning tires, the combination comprising a pair of electrodes, means supporting said electrodes with respective surfaces in spaced substantially parallel opposed relationship, means independent of said electrode supporting means for supporting and holding a tire with the tire section to be conditioned between said surfaces, means for guiding said electrodes for adjusting movement edgewise of their surfaces relative to said tire supporting means, whereby said electrode surfaces can be adjusted relatively with respect to and along a tire wall, while maintaining said electrode surfaces substantially parallel, a pair of members of dielectric material between said electrodes for pressing the tire section to be conditioned therebetween, said latter members having respective surfaces on one side conformably engaging substantially said electrode surfaces respectively, and having respective surfaces on another side contoured to conformably engage substantially the opposite surfaces respectively of the tire section to be conditioned, means for moving said electrodes relatively towards or away from each other while maintaining said electrode surfaces parallel, and means for applying a high frequency electrical potential to said electrodes.

16. In an apparatus for conditioning tires, the combination comprising a pair of spaced electrodes adapted to extend on opposite sides of the tire section to be conditioned and presenting substantially parallel respective opposed surfaces, means for supporting one of said electrodes for adjusting movement edgewise of its surface, means supporting the other electrode for adjusting movement edgewise of its surface, whereby said surfaces are maintained substantially parallel in adjusted position of said electrodes, means for supporting one of said electrodes for adjusting movement in either direction substantially normal to its surface, a pair of members of dielectric material between said electrodes for pressing a tire wall therebetween having respective surfaces on one side conformably engaging substantially said electrode surfaces respectively and having respective opposed surfaces on another side contoured to conformably engage substantially opposite surfaces respectively of the tire section to be conditioned, and means for applying a high frequency electrical potential to said electrodes.

17. In an apparatus for conditioning tires, the combination comprising a pair of opposed electrodes adapted to extend on opposite sides of the tire section to be conditioned, and presenting curved opposed concentric respective surfaces, means for supporting one of said electrodes for angular adjusting movement about the center of its curved surface, means for supporting the other electrode for angular adjusting movement about said center and for movement radially of said center, a pair of pressure applying members of dielectric material between said electrodes having respective surfaces on one side conformably engaging substantially said electrode surfaces respectively and having respective opposed surfaces on another side contoured to conformably engage substantially opposite surfaces respectively of the tire section to be conditioned, and means for applying a high frequency electrical potential to said electrodes.

18. In an apparatus for conditioning tires, the combination comprising a platform, a first block of insulating material supported on said platform, a first electrode plate secured to said block and presenting an upwardly facing surface, an electrode support secured to said platform, a second block of insulating material mounted on said support above said platform and said first block, a second electrode plate secured to said second block above said first electrode plate and presenting a downwardly facing surface substantially parallel and opposite to said upwardly facing electrode surface, the section of the tire to be conditioned being adapted to be supported between said electrode plates, a first pressure applying member of dielectric material having one side conformably engaging substantially the upwardly facing surface of said first electrode plate and having its opposite side contoured for substantial conforming engagement substantially with the adjacent surface of the tire section to be conditioned, a second pressure applying member of dielectric material having one side conformably engaging substantially the downwardly facing surface of said second electrode plate and having its opposite side contoured for substantial conforming engagement substantially with the other adjacent surface of the tire section to be conditioned, an adjusting screw mounted on said electrode support for moving the second block substantially normally of said electrode surfaces, and means for applying a high frequency electric potential to said electrode plates.

EINO E. LAKSO.

REFERENCES CITED

The following references are of record in the file of this patent:

UNITED STATES PATENTS

| Number | Name | Date |
| --- | --- | --- |
| 1,162,397 | Price | Nov. 30, 1915 |
| 1,317,124 | Booth | Sept. 23, 1919 |
| 1,903,025 | Browne | Mar. 28, 1933 |
| 2,112,418 | Hart | Mar. 29, 1938 |
| 2,280,771 | Dufour et al. | Apr. 28, 1942 |
| 2,302,133 | Maze | Nov. 17, 1942 |
| 2,318,779 | Hovlid | May 11, 1943 |
| 2,322,903 | Wilkoff | June 29, 1943 |
| 2,340,692 | Ridd | Feb. 1, 1944 |
| 2,347,952 | James | May 2, 1944 |

FOREIGN PATENTS

| Number | Country | Date |
| --- | --- | --- |
| 468,608 | Germany | Sept. 9, 1927 |